United States Patent Office 3,445,238
Patented May 20, 1969

3,445,238
WHEY COMPOSITION FOR MAKING YEAST-RAISED DOUGH PRODUCTS
Ingmar B. Eggen, Downers Grove, and Andrew D. Singleton, Northfield, Ill., assignors to National Dairy Products Corporation, New York, N.Y., a corporation of Delaware
No Drawing. Filed July 19, 1965, Ser. No. 473,214
Int. Cl. A21d 2/00
U.S. Cl. 99—91    7 Claims

ABSTRACT OF THE DISCLOSURE

A whey product for improving the water absorption capability and handling characteristics of yeast-fermented doughs wherein corn flour is employed as a hydrophilic agent in an amount from 5 to 20 percent by weight of the whey product.

---

The present invention relates generally to an improved whey product and, more particularly, it relates to an improved whey product which is particularly adapted for use in yeast-fermented doughs.

The use of milk solids as a component of yeast-fermented dough is, of course, well known. For example, whole milk has probably been used as a constituent in the preparation of yeast-fermented bread dough throughout recorded history. In recent years, with the development of mass production methods of manufacture of bread, the use of non-fat milk solids, and particularly of non-fat milk solids which have been subjected to varying degrees of heat treatment, has been common.

The provision of non-fat milk solids in a yeast-fermented dough improves the water absorption capability and the handling characteristics of the dough. Such improved absorption and handling characteristics are desirable in commercial bread making operations. Other milk-derived materials, particularly whey solids, have also been used in an attempt to provide properties equivalent to those obtained with non-fat milk solids. A particular whey composition which provides substantially the same properties as non-fat milk solids is the subject matter of United States Letters Patent No. 3,061,442, owned by the assignee of the present application. Such other milk-derived materials have frequently been used in combination with a hydrophilic agent which will provide the desired handleability of the dough in commercial bread baking operations.

It is the primary object of the present invention to provide an improved whey product for use as a constituent of yeast-fermented doughs.

It is a further object of the present invention to provide an improved whey product for use as a constituent of yeast-fermented doughs which includes a hydrophilic agent which provides improved handling characteristics. Other objects and advantages of the present invention will become obvious from the following description and claims.

In accordance with the present invention, there is provided a yeast-fermented dough constituent which includes whey solids, buffering and fortifying salts and minerals, and a hydrophilic agent comprising corn flour. The corn flour may be the product commercially available by that name, or it may be a corn flour which has been partially dextrinized and pre-gelatinized.

More particularly, in accordance with the present invention the whey solids of the dough constituent comprise the serum solids in the whey obtained from cheese making operations, and also comprise additional amounts of lactalbumin. Lactalbumin is the proteinaceous material which is recovered from whey by heat treatment of the whey, which denatures a portion of its contained protein, followed by separation of the denatured protein from the remainder of the whey by filtration or centrifugation. The recovered protein is lactalbumin.

The buffering and fortifying minerals and salts of the dough constituents of the present invention comprise harmless edible compounds which provide a dough constituent having a pH in the range of between about 7.0 and 8.0, and which provide a buffering effect in the dough constituent at a pH of between about 5.1 and about 5.4. Such buffering and fortifying salts and minerals are in addition to those occurring naturally in the whey solids of the dough constituent.

The buffering and fortifying salts and minerals comprise calcium and phosphate compounds, at levels which provide the desired pH and buffering effects. Generally, the levels of calcium and phosphate compounds are the same as those set forth in United States Letters Patent No. 3,061,442, to which reference has previously been made. Thus, calcium compounds are provided at levels such that the dough constituent comprises calcium in an amount more than about 1 percent and less than about 2 percent. Phosphate compounds are added at levels such that the dough constituent comprises $P_2O_5$ in an amount of more than about 1.5 percent and less than about 2.5 percent.

Lactalbumin is provided in the dough constituent at a level of from about 1 percent to about 4 percent, and preferably at a level of about 2 percent to 3 percent.

The dough constituent of the present invention further comprises corn flour at a level of from about 5 percent to about 20 percent. The provision of corn flour in the dough constituent is an important feature of the present invention, and provides an unexpected beneficial result in comparison with they products heretofore known for use as dough constituents.

The corn flour may comprise a flour made from corn which has been cleaned to remove extraneous materials, and which preferably has been subjected to electrostatic treatment for ridding it of such materials. The cleaned corn is then washed with water, and is thereafter processed to remove a portion of the hull and of the germ of the corn kernel. The resultant corn material is thereafter roller ground to provide a ground corn material of various particle sizes. The corn flour of the present invention is that fraction of the ground corn having a particle size of less than 50 mesh (U.S. Standard sieve). The corn fluor has the following analysis:

| Ingredient: | Percent by weight |
|---|---|
| Protein | 7.3–8.5 |
| Fat | 1.7–3.0 |
| Fibre | 0.7–1.1 |
| Ash | 0.5–0.8 |
| Moisture | 8.0–11.5 |

Alternatively, the corn flour of the present invention may comprise a flour made in accordance with the foregoing procedure but which has also been subjected to dry heating to effect partial dextrinization, and to heating under moist conditions to effect partial gelatinization of its contained starch.

EXAMPLE

As an example of the practice of the present invention, whey obtained from the manufacture of cheddar cheese is concentrated by vacuum evaporation to a solids content of about 50 percent. To such whey concentrate is added calcium oxide (CaO) at a level sufficient to increase the pH of the whey concentrate to about 6.2.

Corn flour, having an analysis within the range set forth in the preceding table, and lactalbumin are separately dispersed in cold water to provide a first dispersion. In this connection, the water temperature should be maintained below about 140° F. in order to avoid difficulty in subsequent processing. The dispersion is added to the foregoing whey concentrate.

Thereafter, calcium chloride ($CaCl_2 \cdot 2H_2O$), dicalcium phosphate ($CaHPO_4 \cdot 2H_2O$) and an additional amount of calcium oxide are also dispersed in water, and this dispersion is added to the mixture of whey concentrate and the first dispersion. The resultant mixture has a pH of 8.0–8.4.

The resultant mixture is thereafter spray dried, and the dry material provides a dough constituent comprising the following:

| Ingredient: | Percent by weight |
|---|---|
| Whey solids | 84.7 |
| Lactalbumin | 2.0 |
| Calcium chloride | 1.1 |
| Dicalcium phosphate | 1.3 |
| Calcium oxide | 0.9 |
| Corn flour | 10.0 |

The dough constituent has a pH of about 7.4.

The dough constituent is utilized to make bread by the conventional sponge method. A sponge is prepared by placing 562 cc. of water in a mixing bowl, to which is added 780 grams of flour. 39 grams of bakers' yeast and 7.0 grams of yeast food are also added.

A dough mix is prepared comprising the following:

| Ingredient: | Percent by weight |
|---|---|
| Water | 28.70 |
| Flour | 40.0 |
| Sucrose | 4.0 |
| Shortening | 3.00 |
| Salt | 2.00 |
| Dough constituent | 4.00 |

The sponge and the dough mix are combined, and a dough is prepared in accordance with conventional procedures, and subsequently is baked.

Bread made from such dough is then compared with a control bread which is identically prepared except that non-fat milk solids is used in the dough mix instead of the dough constituent of the present invention. The bread made utilizing the dough mix comprising the dough constituent of the present invention is equivalent to the control bread, and has substantially improved resistance to staling.

Bread made from dough comprising the whey product of the present invention is also compared to bread which is identically prepared except that the whey product of United States Letters Patent No. 3,061,442 is used in the dough mix. The bread comprising the dough constituent of the present invention has substantially improved grain and crumb color, and is otherwise equivalent to that made in accordance with that patent.

Thus, there has been provided an improved whey product for use as a constituent in yeast-fermented dough. The improved whey product comprises a hydrophilic agent which provides improved dough handling characteristics and absorption products, and which is fully comparable to results obtained utilizing non-fat milk solids.

Various of the features of the present invention are set forth in the following claims.

What is claimed is:

1. An improved whey product for use as a constituent in yeast-fermented dough products comprising, in combination, whey solids, buffering and fortifying salts and minerals, and a hydrophilic agent, said buffering and fortifying salts and minerals comprising harmless edible calcium and phosphorous compounds, said whey products having a pH in the range of between about 7.0 and 8.0, said hydrophilic agent comprising corn flour at a level of from about 5 percent to about 20 percent by weight of said whey product.

2. An improved whey product for use as a constituent in yeast-fermented dough products comprising, in combination, whey solids, buffering and fortifying salts and minerals, and a hydrophilic agent, said buffering and fortifying salts and minerals comprising harmless edible calcium and phosphorous compounds, said whey product having a pH in the range of between about 7.0 and 8.0, said hydrophilic agent comprising corn flour at a level of about 10 percent by weight of said whey product.

3. An improved whey product for use as a constituent in yeast-fermented dough products comprising, in combination, whey solids, buffering and fortifying salts and minerals, and a hydrophilic agent, said buffering and fortifying salts and minerals comprising harmless edible calcium and phosphorous compounds, said whey product having a pH in the range of between about 7.0 and 8.0, said hydrophilic agent comprising corn flour at a level of from about 5 percent to about 20 percent by weight of said whey product, said whey solids including additional lactalbumin in an amount sufficient to provide a level of lactalbumin in said whey product of from about 1 percent to about 4 percent above the level of lactalbumin supplied by the whey solids.

4. An improved whey product for use as a constituent in yeast-fermented dough products comprising, in combination, whey solids, buffering and fortifying salts and minerals, and a hydrophilic agent, said buffering and fortifying salts and minerals comprising harmless edible calcium and phosphorous compounds, said whey product having a pH in the range of between about 7.0 and 8.0, said hydrophilic agent comprising corn flour at a level of from about 5 percent to about 20 percent by weight of said whey product, said whey solids including additional lactalbumin in an amount sufficient to provide a level of lactalbumin in said whey product of from about 2 percent to about 3 percent above the level of lactalbumin supplied by the whey solids.

5. An improved whey product for use as a constituent in yeast-fermented dough products comprising, in combination, whey solids, buffering and fortifying salts and minerals, and a hydrophilic agent, said buffering and fortifying salts and minerals comprising harmless edible calcium and phosphorous compounds, said whey product having a pH in the range of between about 7.0 and 8.0, said hydrophilic agent comprising corn flour at a level of from about 5 percent to about 20 percent by weight of said whey product, said corn flour having a particle size of less than 50 mesh.

6. An improved whey product for use as a constituent in yeast-fermented dough products comprising, in combination, whey solids, buffering and fortifying salts and minerals, and a hydrophilic agent, said buffering and fortifying salts and minerals comprising harmless edible calcium and phosphorous compounds, said whey product having a pH in the range of between about 7.0 and 8.0, said hydrophilic agent comprising corn flour at a level of from about 5 percent to about 20 percent by weight of said whey product, said corn flour having a particle size of less than 50 mesh and having been subjected to heat treatment to effect partial dextrinization and gelatinization of its contained starch.

7. An improved whey product for use as a constituent in yeast-fermented dough products comprising, in combination, whey solids, buffering and fortifying salts and minerals, and a hydrophilic agent, said buffering and fortifying salts and minerals comprising harmless edible calcium and phosperous compounds, said whey product having a pH in the range of between about 7.0 and 8.0, said hydrophilic agent comprising corn flour at a level of from about 5 percent to about 20 percent by weight of said whey product, said corn flour having a particle size of less than about 50 mesh, said whey solids including additional lactalbumin in an amount sufficient to provide a level of lactalbumin in said whey product of from about 1 percent to about 4 percent above the level of lactalbumin supplied by the whey solids.

References Cited

UNITED STATES PATENTS 2,602,746  7/1952  Meade _____ 99—56
3,061,442  10/1962  Ward et al. _____ 99—91

OTHER REFERENCES

Matz, S. A.: Bakery Technology and Engineering, The AVI Pub. Co., Inc., Westport, Conn., 1960, p. 20. TX 763 M33 C. 2 (Copy in Group 172).

RAYMOND N. JONES, *Primary Examiner.*

U.S. Cl. X.R.

99—57